United States Patent
Schmidt et al.

(10) Patent No.: US 11,074,368 B2
(45) Date of Patent: Jul. 27, 2021

(54) OBFUSCATION AND ROUTING OF SENSITIVE ACTIONS OR REQUESTS BASED ON SOCIAL CONNECTIONS

(71) Applicant: International Business Machines Corporation, Armonk, NY (US)

(72) Inventors: Jeffrey A. Schmidt, Rochester, MN (US); Jason A. Nikolai, Rochester, MN (US); John M. Santosuosso, Rochester, MN (US); Adam D. Braham, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/160,354

(22) Filed: Oct. 15, 2018

(65) Prior Publication Data

US 2020/0117832 A1 Apr. 16, 2020

(51) Int. Cl.
| | | |
|---|---|---|
| H04L 29/00 | (2006.01) | |
| G06F 21/62 | (2013.01) | |
| G06Q 10/10 | (2012.01) | |
| G06Q 50/00 | (2012.01) | |
| H04L 29/06 | (2006.01) | |

(52) U.S. Cl.
CPC ....... *G06F 21/6254* (2013.01); *G06Q 10/105* (2013.01); *G06Q 50/01* (2013.01); *H04L 63/10* (2013.01)

(58) Field of Classification Search
CPC ... H04L 63/10; G06F 21/6254; G06Q 10/105; G06Q 50/01
See application file for complete search history.

(56) References Cited

U.S. PATENT DOCUMENTS

| | | | |
|---|---|---|---|
| 6,334,133 B1* | 12/2001 | Thompson | ..... G06Q 10/063112 |
| 8,225,376 B2 | 7/2012 | Zuckerberg et al. | |
| 8,825,773 B1* | 9/2014 | Gauvin | ............... H04L 63/0281 709/206 |
| 10,346,444 B1* | 7/2019 | Heitman | ............... G06F 16/211 |
| 2002/0029160 A1* | 3/2002 | Thompson | ......... G06Q 10/1097 705/7.14 |

(Continued)

OTHER PUBLICATIONS

Felt et al., "Privacy Protection for Social Networking Platforms." Workshop on Web 2.0 Security and Privacy. Oakland, CA. May 22, 2008.

(Continued)

*Primary Examiner* — Don G Zhao
(74) *Attorney, Agent, or Firm* — Patterson + Sheridan, LLP

(57) ABSTRACT

Improvements in data security and privacy may be realized by receiving a service request including a social range and a requestor identity; mining a first social network to create a social graph of entities within the social range of the requestor identity, wherein the entities are represented by nodes in the social graph linked to a requestor via one or more edges, wherein a number of edges used to link a given entity to the requestor does not exceed the social range; determining whether the social graph includes at least one person matching personnel included in an organizational chart; and in response to determining that the social graph includes no persons matching the personnel included in the organizational chart, transmitting an acceptance response from a provider-side system to a client-side system.

17 Claims, 5 Drawing Sheets

(56) References Cited

U.S. PATENT DOCUMENTS

| | | | |
|---|---|---|---|
| 2003/0088520 A1 | 5/2003 | Bohrer et al. | |
| 2005/0076233 A1 | 4/2005 | Aarts et al. | |
| 2005/0193093 A1 | 9/2005 | Mathew et al. | |
| 2009/0300715 A1 | 12/2009 | Ahn | |
| 2011/0087534 A1* | 4/2011 | Strebinger | G06Q 30/0224 705/14.25 |
| 2012/0054691 A1* | 3/2012 | Nurmi | G06F 16/951 715/854 |
| 2012/0290637 A1* | 11/2012 | Perantatos | G06Q 10/10 709/203 |
| 2012/0317088 A1* | 12/2012 | Pantel | G06F 16/972 707/706 |
| 2013/0073976 A1* | 3/2013 | McDonald | G06F 16/447 715/739 |
| 2013/0254294 A1* | 9/2013 | Isaksson | G06Q 30/0251 709/204 |
| 2014/0150072 A1* | 5/2014 | Castro | H04L 63/104 726/5 |
| 2014/0258282 A1* | 9/2014 | Piantino | G06F 16/447 707/725 |
| 2016/0092040 A1* | 3/2016 | Sherman | H04L 51/32 715/752 |
| 2016/0371625 A1* | 12/2016 | Mosley | G06Q 10/06398 |
| 2017/0004450 A1* | 1/2017 | Rathod | G06Q 10/1053 |
| 2017/0068693 A1* | 3/2017 | Macksood | G06F 16/972 |
| 2017/0076345 A1* | 3/2017 | Pan | H04L 67/22 |
| 2017/0078232 A1* | 3/2017 | Faruk | H04L 67/02 |
| 2017/0139956 A1* | 5/2017 | Qiao | G06F 16/11 |
| 2017/0262653 A1* | 9/2017 | Dang | G06F 16/50 |
| 2017/0277691 A1* | 9/2017 | Agarwal | H04W 4/21 |
| 2017/0277907 A1* | 9/2017 | Dang | G06F 21/6254 |
| 2018/0174190 A1* | 6/2018 | Ferreira | G06Q 30/0246 |
| 2018/0300413 A1* | 10/2018 | Wang | G06F 16/248 |
| 2018/0349485 A1* | 12/2018 | Carlisle | G06F 16/958 |
| 2020/0036810 A1* | 1/2020 | Howard | G06N 5/022 |

OTHER PUBLICATIONS

Jeckmans et al. "Privacy-Preserving Profile Matching Using the Social Graph," IEEE, 2011.

"Contextual Call Routing for Growing Revenue," 8 pages, [Accessed Online Mar. 9, 2018] https://www.dialogtech.com/products/contextual-call-routing.

* cited by examiner

OBFUSCATION AND ROUTING OF SENSITIVE ACTIONS OR REQUESTS BASED ON SOCIAL CONNECTIONS

BACKGROUND

The present disclosure relates to data privacy, and more specifically, to improvements in data privacy based on social connections between the requestor and user(s) of sensitive information. Although encryption, need-to-know access, redaction, and data retention policies can help keep sensitive personal information private, those sensitive data still can be misused by persons with appropriate access permissions. Additionally, a person with legitimate access to sensitive data can learn information that another person wishes to keep private during otherwise legitimate use of that sensitive personal information.

SUMMARY

According to one embodiment of the present disclosure, a method for improving data security and privacy is provided, the method comprising: receiving a service request including a social range and a requestor identity; mining a first social network to create a social graph of entities within the social range of the requestor identity, wherein the entities are represented by nodes in the social graph linked to a requestor via one or more edges, wherein a number of edges used to link a given entity to the requestor does not exceed the social range; determining whether the social graph includes at least one person matching personnel included in an organizational chart; and in response to determining that the social graph includes no persons matching the personnel included in the organizational chart, transmitting an acceptance response from a provider-side system to a client-side system.

According to another embodiment of the present disclosure, a system for improving data security and privacy is provided, the system, comprising: a processor; and a memory storage device including instructions that when executed by the processor enable the system to: receive a service request including a social range and a requestor identity; mine a first social network to create a social graph of entities within the social range of the requestor identity, wherein the entities are represented by nodes in the social graph linked to a requestor via one or more edges, wherein a number of edges used to link a given entity to the requestor does not exceed the social range; determine whether the social graph includes at least one person matching personnel included in an organizational chart; and in response to determining that the social graph includes no persons matching the personnel included in the organizational chart, transmit an acceptance response from a provider-side system to a client-side system.

According to a further embodiment of the present disclosure, a computer program product for improving data security and privacy is provided, the computer program product comprising: a computer-readable storage medium having computer-readable program code embodied therewith, the computer-readable program code executable by one or more computer processors to: receive a service request including a social range and a requestor identity; mine a first social network to create a social graph of entities within the social range of the requestor identity, wherein the entities are represented by nodes in the social graph linked to a requestor via one or more edges, wherein a number of edges used to link a given entity to the requestor does not exceed the social range; determine whether the social graph includes at least one person matching personnel included in an organizational chart; and in response to determining that the social graph includes no persons matching the personnel included in the organizational chart, transmit an acceptance response from a provider-side system to a client-side system.

DETAILED DESCRIPTION

Figure 1:
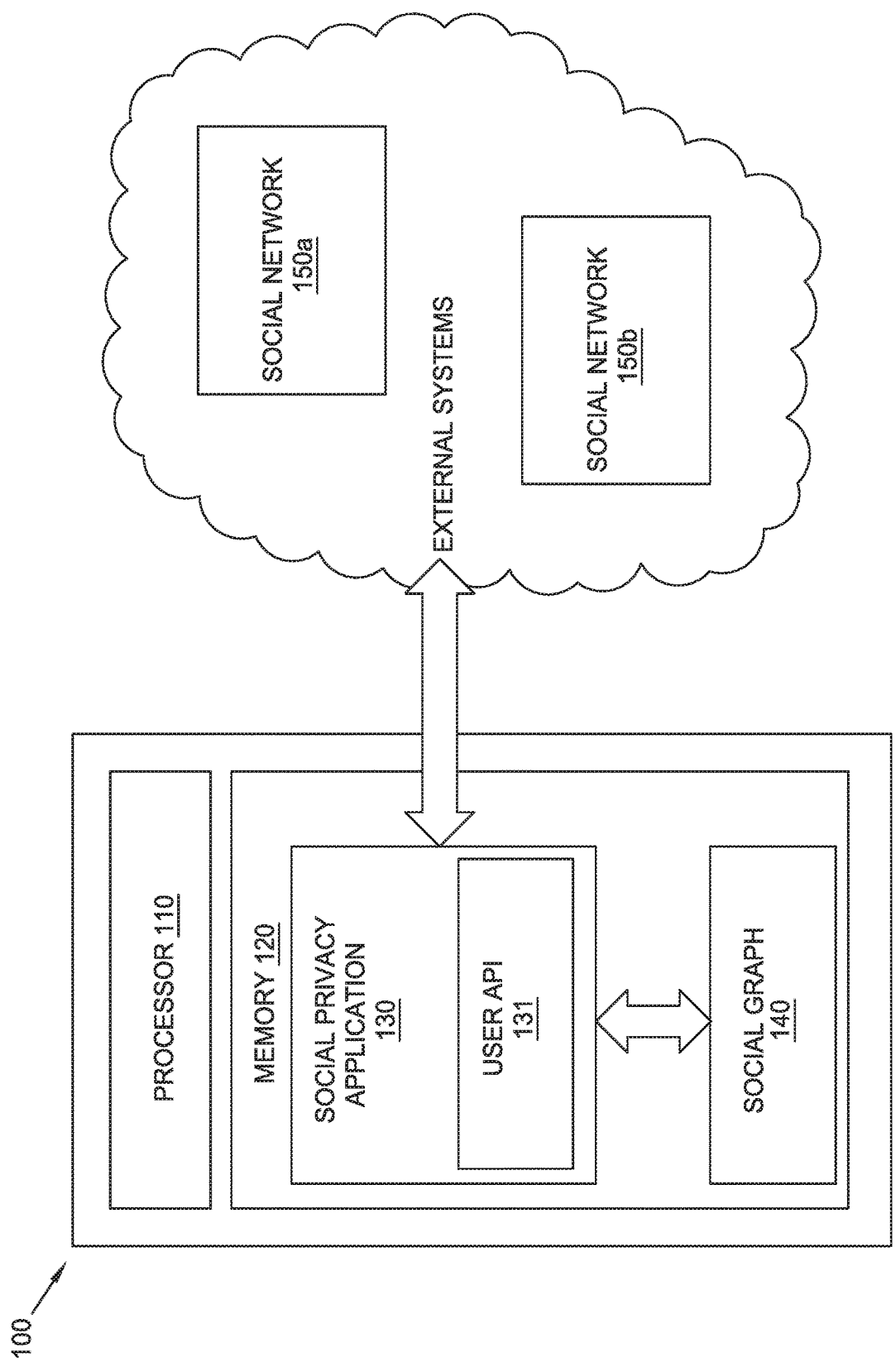
FIG. 1 illustrates a client-side system, according to aspects of the present disclosure.

Persons of all types make decisions on where to purchase products or services of a sensitive or embarrassing nature based on the expected (or hoped-for) privacy of that purchase. Although laws and regulations for data protection exist to protect electronic data, a human factor remains in several cases. For example, both online pharmacies and brick-and-mortar pharmacies may fill an order for a medication and keep the order private as a company or organization, but human pharmacists fill those orders. If the pharmacist filling the order knows the patient who placed the order, that pharmacist may learn of the medical condition despite the patient's desire for privacy. To further protect the privacy of persons from the inherent human factor in providing services, the present disclosure leverages social networking data to insulate the actions of persons from friends, relatives, business associates, and other contacts within a predefined social range to provide recommended entities with which to perform privacy-centric actions. By leveraging social networks according to the present disclosure, an external user is given per-use control of personal data on provider systems in addition to the data controls employed by those providers, without requiring credentials in the provider's system. One of ordinary skill in the art will recognize these and other improvements to the functionality of computing devices on review of the present disclosure.

As used herein, a social range defines how distantly related one person is to another in a social graph. In one embodiment, a friend of the person has a social range of 1, a friend of a friend has a social range of 2, a friend of a friend of a friend has a social range of 3, etc. For example, Alice may be noted in a social network as friends with Bob and Carol, therefore Alice shares a social range of 1 with both Bob and Carol. Bob and Carol, as friends of Alice, each have a social range of 2 with each other, unless a more direct connection can be discovered between Bob and Carol. Continuing the example, if Bob and Carol have a social range of 2, and Dave is friends with Bob (but not Alice or Carol), Alice has a social range of 2 to Dave (Alice to Bob to Dave), and Carol has a social range of 3 to Dave (Carol to Alice to Bob to Dave).

The social network data may specify various relationships between persons in the social graphs, and data from multiple social networks and other sources may be combined to define a social graph between various persons. A user may define which relationship types or sources are used when determining a social range between persons. For example, a person may define a first social range limit for friends (or other social contacts), a second social range limit for business associates (or other business contacts), and a third social range limit for relatives (or other familial contacts). Additionally, the user may set various other criteria (e.g., geographic distance, source of relationship, whether multiple relationships exist) when determining whether a social connection is considered in determining a social range between two or more persons.

FIG. 1 illustrates an example client-side system 100. The client-side system 100 is illustrated as including a processor 110 and a memory 120, but a client-side system 100 may include more than one processor 110 or memory 120 in other embodiments. Similarly, a client-side system 100 will be understood to potentially include other components than a processor 110 and a memory 120 (e.g., various input/output devices) that are not illustrated in FIG. 1 so as to not distract from the inventive concepts described herein. Examples of a client-side system 100 include various computing devices such as, but not limited to: a personal computer, a laptop computer, a tablet computer, a smart phone, a feature phone, an e-reader, and a video game system.

The memory 120 includes processor-executable instructions for a social privacy application 130, among other applications, operating systems, and stored data. The memory 120 may also include a social graph 140, or be in communication with another system hosting a social graph 140 or external data source by which the social graph 140 may be built or augmented. The social graph 140 organizes a series of individual persons and relationships between those individual persons as nodes (representing the persons) and edges connecting the nodes (representing the relationships). Each node may include information about the person represented by that node, including, but not limited to: name, age, gender, domicile, contact information, and privacy preferences. Each edge may include information about the relationship represented by that node, including, but not limited to: a type of relationship (kinship/friendship/professional), a duration of the relationship, a source of the relationship (e.g., pulled from social network 150a or social network 150b, pulled from an email application's contacts list), and a strength of the relationship (e.g., a frequency of communication).

In various embodiments, the social privacy application 130 on the client-side system 100 locally builds the social graph 140 from the available data sources in communication with the social privacy application 130, such as a first social network 150a and a second social network 150b (generally, social network 150). In other embodiments the social privacy application 130 downloads a portion of a social graph 140 from a central server, wherein the portion downloaded to the client-side system 100 is centered on the user of the client-side system 100 and includes persons within a social range of n of the user, where n is the highest specified social range limit received from the user. The social privacy application 103, when provided on a client-side system 100, may include a user API 131 to interface with various other application running from the memory 120, such as, for example, an internet browser, a provider-specific application, a social network application, an email client or the like.

Figure 2:
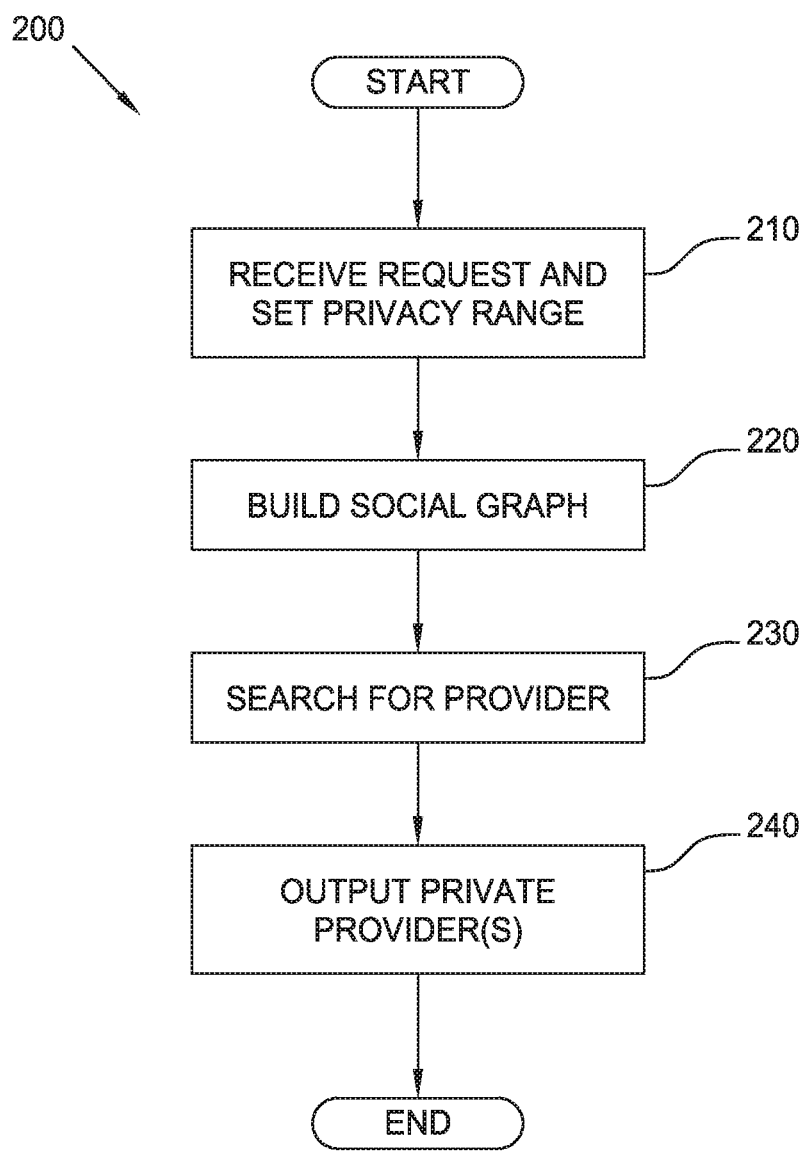
FIG. 2 is a flowchart of a method to specify a privacy level for a requested action and receive a recommendation on the expected privacy level provided by various entities, according to aspects of the present disclosure.

With reference to FIG. 2, a user may interact with the client-side system 100 according to the example method 200 to specify a privacy level for a requested action and receive a recommendation on the expected privacy level provided by various entities. By performing method 200, the functionality offered by the client-side system 100 is expanded and improved to offer greater privacy to the user of the client-side system 100.

At block 210, the social privacy application 130 receives a service request and sets a privacy range for the user-initiated request for service. In some embodiments, the user may select a desired privacy range for the request via a drop-down menu, a text input box, a stored preference, or the like in the social privacy application 130 or in another application in communication with the social privacy application 130 via a user API 131 to specify the desired privacy range. In additional embodiments, the social privacy application 130 classifies the request (e.g., based on type of product) and automatically sets a privacy range based on a privacy range selected for a related product, the aggregated privacy ranges from other users making a similar request (e.g., crow-sourcing), and/or an aggregated privacy range for requests to a given provider. The user may set the privacy range for a given request or may set specific goods to use a specific privacy range in subsequent orders.

For example, the social privacy application 130 may set a privacy range of 1, indicating that direct contacts of the user are not allowed to learn of the request or the contents thereof, but contacts of contacts may learn of the request. In another example, the social privacy application 130 may set a privacy range of 3, indicating that no one who can be linked as a contact, of a contact, of a contact is allowed to learn of the request or the contents thereof. In a further example, the social privacy application 130 may set the privacy range of 0 (or null) to indicate that the user is unconcerned of a contact (or any contacts thereof) learning of the request or the contents thereof.

In some embodiments, the social privacy application 130 sets privacy ranges for different social networks to different levels. For example, if a user indicates that the use of hair dye is sensitive for maintaining a professional image, and orders for hair dye are therefore to be kept private from professional contacts, but are of little concern for friendly acquaintances and family members, different privacy ranges may be set for a professional social network and for a social network of friends.

At block 220, the social privacy application 130 builds a social graph 140 of persons from whom the request is to be shielded from. The user is linked by one or more edges to other entities in the social graph 140, which are in turn linked to additional entities via additional edges in the social graph. The entities are represented as nodes in the social graph 140 and the edges between entities may specify various strengths and types of connections between the entities. Each node in the social graph 140 may include data related to the name of the entity, whether the entity is human/non-human, a location of the entity, etc. Each edge may include data indicating a source for the edge, a frequency of interaction between the entities linked by the edge, a relationship indicated by the data source (e.g., cousins, friends, co-workers, past colleagues), etc. Entities may be linked by one or more edges. For example, a user who is "friends" with a given person in a first social network, and a "colleague" of the given person in a second social network may be linked in the social graph 140 with the given person via a first edge associated with connections from the first social network and a second edge associated with connections from the second social network.

The user may supply the social privacy application 130 with credentials to access one or more social networks 150 that are mined to collect contact lists and data on those contacts. The user may also supply credentials for one or more other data sources, such as, for example, a contact list on a phone or email application from which relationships with other contacts may be determined. The social privacy application 130 may store the social graph 140 for later use (e.g., in a second iteration of method 200), and may update the social graph 140 with new relationships or new entities discovered from the available social networks 150, or may prune the social graph 140 to remove entities or relationships that no longer appear in the social networks 150.

Based on the privacy range(s) set (per block 210), the social privacy application 130 determines a list of contacts that the user wishes to keep the request private from. For example, with a privacy range of 1, a list of persons that may be connected to the user via one edge in the social graph 140 is returned. In another example, with a privacy range of 2, a list of all persons that may be connected to the user via one edge or via two edges through an intermediate node in the social graph is returned. In a further example, with a privacy range of 0 or null, a blank list of persons from the social graph 140 is returned.

In various embodiments, the social graph 140 may include or exclude non-human entities when determining a social range for the user. For example, if Alice is listed as an employee of Big Corporation, but is not marked as a contact of Charlie, who is also listed as an employee of Big Corporation, the social privacy application 130 may include Big Corporation in the social graph 140 as an intermediary contact for Alice and Charlie; indicating that Alice and Charlie are second-order contacts via Big Corporation. In another example of the above scenario, but in which the social privacy application 130 excludes non-human entities when determining a social range for the user, Alice and Charlie may be linked via a third person to be second-order contacts or via additional persons to be third or higher-order contacts of one another.

In some embodiments, the social privacy application 130 may adjust the social range of an individual to the user based on a number of contacts that a person has in the social graph 140. For example, a given person may be considered to be a "social hub" when more than X connections are linked to that person. The social privacy application 130 may treat "social hub" individuals as a closer-order contact than the social graph 140 otherwise would indicate due to the increased opportunities for the social hub to increase contacts among other individuals. In another example, a given person may be consider to be a "secluded individual" when fewer than Y connections are linked to that person. The social privacy application 130 may treat the "secluded individuals" as a further-order contact than the social graph 140 otherwise would indicate due to the reduced opportunities for the secluded individual to contact other individuals.

In other embodiments, a social privacy application 130 may adjust the social range of an individual to the user based on a strength of relationship or a geographic proximity. For example, a user may have a person listed as a first-order contact with whom the user has not communicated with for at least m months, and that person may therefore be removed as a first-order contact or may be treated as a second-order (or higher) contact. In another example, a user may specify that persons outside of geographic region (e.g., persons who the user is unlikely to physically meet when running an errand) may be excluded from the social graph 140 despite falling within the specified privacy range or may be moved to a higher tier of contacts. For example, a person may be indicated as an n-order contact of the user, but due to geographic distance may be treated as an (n+1)-order contact by the social privacy application 130.

The user or the social privacy application 130 may make exceptions for certain persons within a social network for the privacy range either adding or removing indicated person to/from the list generated from the social graph 140. Consider an example in which a user directs the social privacy application 130 set a privacy range of 2 to shield the user from direct contacts and the contacts of the contacts learning of the request, but makes an exception for a spouse or other indicated person to exclude that person from the list of persons to shield the request from. For example, a user may not want persons within a circle of friends to learn of a prescription for a particular medication, but if the user has a spouse who is a pharmacist, the user may not want the spouse's co-workers and old classmates (who include other pharmacists) to be excluded from consideration from filling the order. Consider another example in which a user directs the social privacy application 130 to set a privacy range of 0, but makes an exception for a spouse or other indicated person to include that person in a social graph 140 of persons to shield the request from. For example, a user may not want a spouse to learn of a surprise gift for a birthday party, but the user may not mind (or may even want) the user's friends learning of the gift before the birthday party. Persons for whom exceptions are made may include persons manually indicated for an individual request as well as persons that are stored by the social privacy application 130 for multiple requests, including but not limited to: immediate family members, persons with whom a power of attorney is shared, physicians, and the like.

At block 230, the social privacy application 130 searches for a provider to fulfill a request by the user that satisfies the privacy range(s) specified. In various embodiments, the request provides the social privacy application 130 with a class of providers (e.g., pharmacies, retailers, book stores) that are forwarded the request. In additional embodiments, the request includes a list of persons that are exceptions to the privacy request such as persons to avoid that are not otherwise listed as "friends" or "colleagues" in an existing social graph 140, or persons included in the social graph 140 that the requestor does not mind learning of the request.

At block 240, the social privacy application 130 outputs the providers for the service that meet the privacy requirements of the requestor. In various embodiments, the social privacy application 130 organizes the providers in a user interface to allow the user to select one of the providers to complete the request with. In some embodiments, such as when the user is using a provider-specific application or only one provider returns a positive response, the social privacy application 130 may automatically complete the service request. Method 200 may then conclude.

Figure 3:
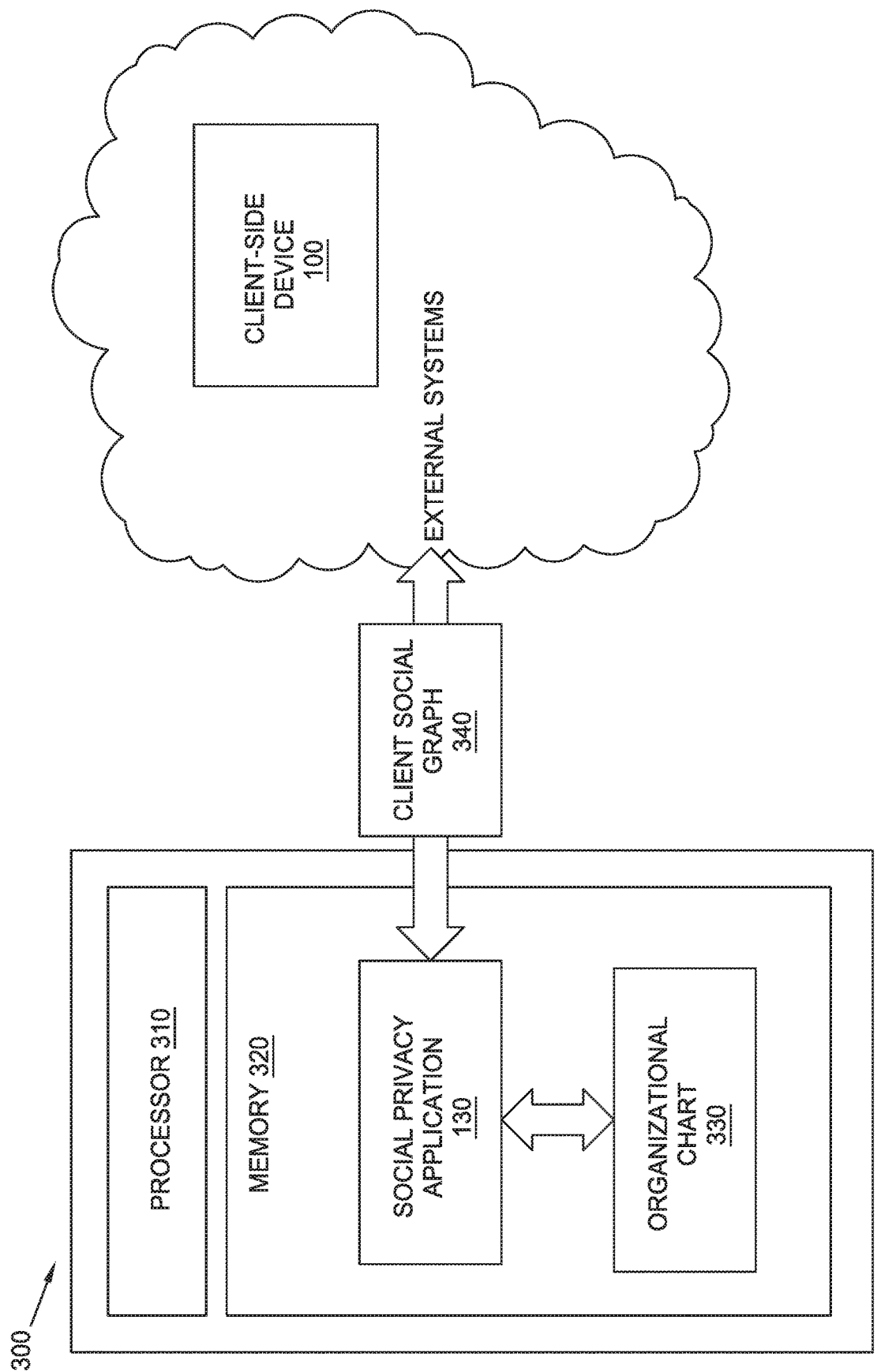
FIG. 3 illustrates a provider-side system, according to aspects of the present disclosure

FIG. 3 illustrates an example provider-side system 300. In addition to or instead of providing client-side recommendations of where to request goods/services from, a social privacy application 130 may be provided on a provider-side system 300. When the social privacy application 130 is provided on the provider-side system 300, the social privacy application 130 examines user requests to determine whether and how the provider can provide the requested service within a requested privacy range. The provider-side system 300 is illustrated as including a processor 310 and a memory 320, but a provider-side system 300 may include more than one processor 310 or memory 320 in other embodiments. Similarly, a provider-side system 300 will be understood to potentially include other components than a processor 310 and a memory 320 (e.g., various input/output devices) that are not illustrated in FIG. 3 so as to not distract from the inventive concepts described herein. Examples of a provider-side system 300 include various computing devices such as, but not limited to: a server computer, a personal computer, a laptop computer, a tablet computer, a smart phone, etc.

The memory 320 includes processor-executable instructions for a social privacy application 130, among other applications, operating systems, and stored data. The memory 320 may also include an organizational chart 330 and/or a client social graph 340, or may be in communication with another system hosting a social graph 140 that may be used as a client social graph 340 or an external data source by which the client social graph 340 may be built or augmented. In various embodiments, the social privacy application 130 on the provider-side system 300 locally builds the client social graph 340 from the available data sources in communication with the social privacy application 130 based on an identity of the requestor that is centered on the requestor and includes persons that can be found within a social range of n of the requestor, where n is the highest specified social range limit received from the requestor. In other embodiments, the requestors transmits the social graph 140 to the provider-side system 300, or transmits a definition for the social graph 140 to the provider-side system 300 that is used as the client social graph 340 by the provider-side system 300.

In various embodiments, the social privacy application 130 on the provider-side system 300 locally builds the organizational chart 330 as a social graph for the persons that work for the service provider (including employees, contractors, and suppliers) that indicate the locations where those persons work, the responsibilities of those persons, data access permissions, and biographical data on those persons (e.g., age, place of domicile, nicknames) to help identify whether a given person working for the service provider is included in the client social graph 340. In some embodiments, known customers who frequent specific locations for the service provider may also be included in the organizational chart 330. For example, a particular user of a loyalty card may be identified as shopping a location A in the organizational chart 330. A requestor seeking to discretely visit a pharmacy may thereby be advised to avoid location A if the particular user is included in the client social graph 340 and the organizational chart 330.

Figure 4:
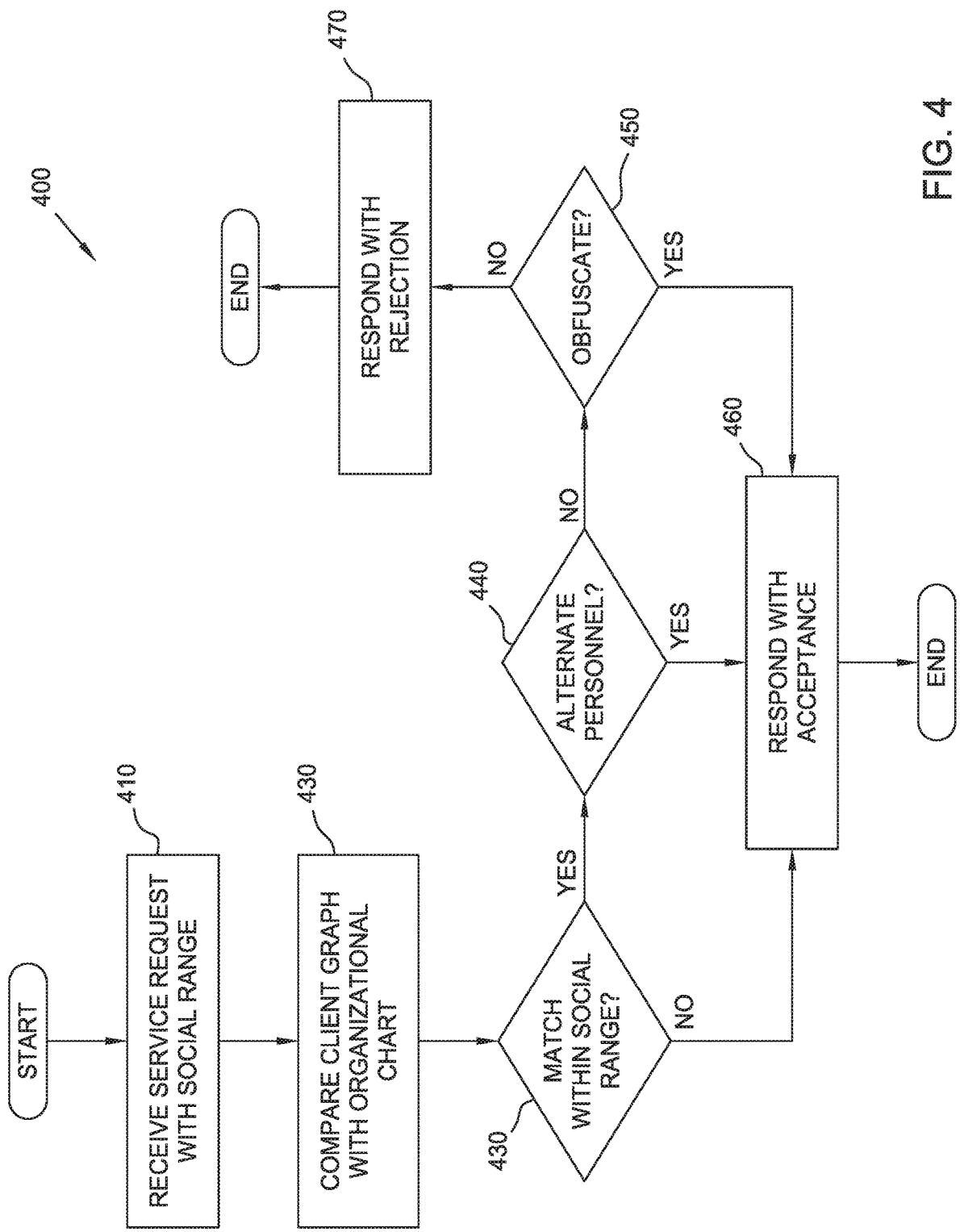
FIG. 4 is a flowchart of a method to ensure a request from a user that specifies a privacy level for a requested action is handled appropriately at the provider, according to aspects of the present disclosure.

With reference now to FIG. 4, a provider may interact via the provider-side system 300 according to the example method 400 to ensure a request from a user that specifies a privacy level for a requested action is handled appropriately at the provider. The provider may perform method 400 in addition to any actions required by law or regulation for computerized data security for personal information to further improve data privacy for the provider-side system 300 and the client.

At block 410, the provider-side system 300 receives a service request from a client that specifies a social range at which to perform the service request with a desired level of privacy. In various embodiments, the service request is accompanied by a client social graph 340 or permissions to access existing social network services to develop a client social graph 340 for a requestor. In some embodiments, a provider may retain a client social graph 340 for a requesting user so that a request after the first may omit the client social graph 340 or include a change log for a client social graph 340 instead of including a full client social graph 340.

In some embodiments, the requestor specifies the social privacy range via the client social graph 340 transmitted to the provider. For example, a requestor may have access to a social graph 140 with a social range up to n levels, and transmits a reduced social graph 140 with (n−1) levels; indicating that the provider is to use the reduced social graph 140 as the client social graph 340. In other embodiments, the requestor specifies the social privacy range via a field in the request to access a subset of a social graph 140 with a larger number of contacts or a previously submitted and stored client social graph 340. For example, a request may submit a social graph 140 with n levels of connections, and submit in a later request that the provider is to use the previously submitted social graph 140, but is to use (n−1) levels within that social graph 140 as the client social graph 340.

At block 420, the social privacy application 130 compares the client social graph 340 with an organizational chart 330 to determine whether any persons in the provider's organization match any persons in the list of contacts that the requestor seeks to avoid learning of the service request. In various embodiments, the social privacy application 130 uses a fuzzy matching algorithm using the names and other biographic data of the persons in the respective lists to determine whether individuals are present on both lists (per block 430), whether the provider can work around persons present on both lists (per block 440), or work with persons present on both lists with data shielded from those persons (per block 450).

At block 430, the social privacy application 130 determines whether the organizational chart 330 includes persons that match persons included in the client social graph 340 within the social range specified by the requestor. The social privacy application 130 may use known nicknames, spelling variations, and aliases for persons identified in the organizational chart 330 or client social graph 340 when performing a fuzzy matching procedure. For example, "John Doe" and "Johnathan Doe" may be identified as a candidate match, as "John" is a known nickname for "Johnathan." In another example, "Jon Doe" and "John Doe" may be identified as a candidate match, as "Jon" and "John" are known spelling variants for each other. In a further example, person preferring the use of a nickname or middle name rather than a first name may be associated with a known alias such that "Ethel Doe" may be a candidate match for a person also identified as "Jane Ethel Doe".

The fuzzy match procedure used by the social privacy application 130 may use additional data related to the persons identified in the client social graph 340 and the organizational chart 330 to improve the precision of matches. For example, similarities in age, educational background, profession, employer, etc., indicate that a candidate match is a stronger potential match, while mismatches in age, educational background, profession, employer, etc., indicate that a candidate match is a weaker potential match. For example, if the client social graph 340 includes data on a "Jane Doe" who is listed as working for Acme Incorporated, the social privacy application 130 run by Big Corporation may determine that the "Jane Doe" in the organizational chart 330 is not the same person as indicated in the client social graph 340 due to the stated difference in employer. In another example, if the client social graph 340 includes data on a "John Doe" who is listed as being born in 1970, and the organizational chart 330 includes data on a "Johnathan Doe" who is listed as being born in 1989 and an "Ivan 'John' Doe" who is listed as being born in 1970, the social privacy application may determine that "Ivan 'John' Doe" matches (and "Johnathan Doe" does not match) the "John Doe" from the client graph 340.

The social privacy application 130 may also use geographic data about persons included in the organizational chart 330 (e.g., place of work, place of residence), persons included in the client social graph 340, and the requestor to improve the accuracy of the fuzzy matching. For example, the social privacy application 130 may remove a person as a match between the organizational chart 330 and the client social graph 340 when the geographic social range of the requestor does not extend to the geographic work range of the person in the organizational chart 330. For example, a requestor may include a person named "Jane Doe" in a client social graph 340 to keep a requested service private from, and a provider may employ several persons named "Jane Doe." The social privacy application 130 may determine whether any of the Janes Doe employed are within an interaction range of the requestor or a person within the privacy range specified by the requestor. For example, if the "Jane Doe" in the organizational chart 330 is located more than X miles from the requestor, a likelihood of that particular Jane Doe matching another person with the same name in the client social graph 340 is diminished.

If the social privacy application 130 determines that the organizational chart 330 includes at least one person that match a person included in the client social graph 340 within the social range specified by the requestor, method 400 proceeds to block 440. If the social privacy application 130 determines that the organizational chart 330 does not include any persons that match a person included in the client social graph 340 within the social range specified by the requestor, method 400 proceeds to block 460.

At block 440, the social privacy application 130 determines whether the organizational chart 330 indicates alternative personnel exist such that the at least one person in the organizational chart 330 that is determined to match a person within the social range in the client social graph 340 can be routed around for the request. For example, if a "John Doe" determined to be the same person in the organizational chart 330 and in the client social graph 340 (within the specified social range) works at location A for the service provider, the social privacy application 130 may determine that location B is available to handle the request for the requestor without involving any persons indicated in the client social graph 340 within the specified social range.

In another example, if a "Jane Doe" determined to be the same person in the organizational chart 330 and in the client social graph 340 (within the specified social range) works for the service provider, but in a role that is not associated with handling the service request, the social privacy application 130 may determine that the request will be handled with alternative personnel from those included in the specified social range of the client social graph 340. For instance, if the request is handled by an accountant, a pharmacist, and a shipping specialist, but the Jane Doe determined to be a match is an executive, a janitor, an Information Technology (IT) specialist, or some other profession than those who handle the request, the social privacy application 130 may determine that alternative personnel are available to handle the request without involving any persons indicated in the client social graph 340 within the specified social range.

In some embodiments, the requesting user may specify in the service request that the data involved in the service request are too sensitive to allow potential access by persons in the client social graph 340. Therefore, the social privacy application 130 may determine, based on the requesting user's requirements, that alternative personnel are not available. For example, a requesting user may be worried that a service request usually handled by a pharmacist may be seen by an acquaintance who is a janitor, an IT specialist, or a person of some other profession, or that a shared IT infrastructure at the provider may allow pharmacists at other locations to view the sensitive data. The requesting user may therefore stipulate in the service request that the social privacy application 130 is not allowed to find alternative personnel to handle the service request without further precautions being taken.

If the social privacy application 130 determines that the organizational chart 330 includes alternative personnel who can handle the request within the privacy range specified, method 400 proceeds to block 460. If the social privacy application 130 determines that the organizational chart 330 does not include alternative personnel who can handle the request within the privacy range specified, method 400 proceeds to block 450.

At block 450, the social privacy application 130 determines whether the data included in the service request can be obfuscated from personnel in the organizational chart 330 who appear within the privacy range of the client social graph 340. In some embodiments, the requesting user specifies that obfuscation is not an option, in which case the social privacy application 130 determines that obfuscation is not available. In other embodiments, the social privacy application 130 determines what data need to be hidden to preserve the requesting user's privacy, and whether those data can be hidden from personnel in the organizational chart 330.

In response to a determination that the data included in the service request can be obfuscated from personnel who appear within the privacy range of the client social graph 340, the social privacy application 130 may obfuscate (e.g., remove, encrypt, salt, password protect, or replace) one or more of the client's Personally Identifiable Information (PII) or the request information, or otherwise prevent persons with legitimate access to the data from learning of the sensitive request. In various embodiments, PII include one or more of a name, a physical address, a mailing address, an email address, a phone number, a fax number, a personal identification number (e.g., Social Security Number, client number, driver's License number), emergency contact information, etc. The data in the request that may be obfuscated may include the name of products/services, quantities In some embodiments, the social privacy application 130 substitutes nonce characters/words or a predefined less-sensitive placeholders for data to be obfuscated. For example, instead of using the actual name of the client when handling the request, a placeholder name such as, for example, "John Doe" or "Jane Doe," may be substituted for the requestor's actual name. Similarly, placeholders may be used for one or more other elements of PII or the data in the request. For example, a placeholder mailing address may be used until a shipping label is created for the service request. In another example, a request for hair dye that the client deems sensitive may use "shampoo" as a placeholder, a request for a medication may use a chemical name in place of a brand or common name (e.g., acetylsalicylic acid or ASA instead of Aspirin), a request for adult diapers may use a placeholder of "pads", etc.

The social privacy application 130 may obfuscate and un-obfuscate sensitive data for storage and use at the provider at various points of processing the service request. For example, PII for the client may be stored in an encrypted state until a shipping label is printed with the PII in an unencrypted state so that a package can be routed to the correct address. In another example, sensitive data for a medication name may remain password protected throughout the handling process and are only accessible to pharmacy personnel with the correct credentials (and not accessible to persons included in the client social graph 340 within the specified privacy range).

If the social privacy application 130 determines that the organizational chart 330 includes alternative personnel who can handle the request within the privacy range specified, method 400 proceeds to block 460. If the social privacy application 130 determines that the organizational chart 330 does not include alternative personnel who can handle the request within the privacy range specified, method 400 proceeds to block 450.

At block 460, the social privacy application 130 responds to the client with an acceptance to handle the service request with privacy settings according to the specified social range. In various embodiments, the social privacy application 130 responds by transmitting a positive determination to a client-side system 100 or other requestor device, which may receive positive and negative responses from several service providers. In other embodiments, the social privacy application 130 responds by beginning the process to fulfill the client's request. Method 400 may then conclude.

At block 470, the social privacy application 130 responds to the client with a rejection to handle the service request with privacy settings according to the specified social range. In various embodiments, the social privacy application 130 responds by transmitting a negative determination to a client-side system 100 or other requestor device, which may receive positive and negative responses from several service providers. In some embodiments, the social privacy application 130 responds in a rejection by specifying a privacy setting that the provider is capable of providing, and allows the client to resubmit a service request with a different social range. Method 400 may then conclude.

Figure 5:
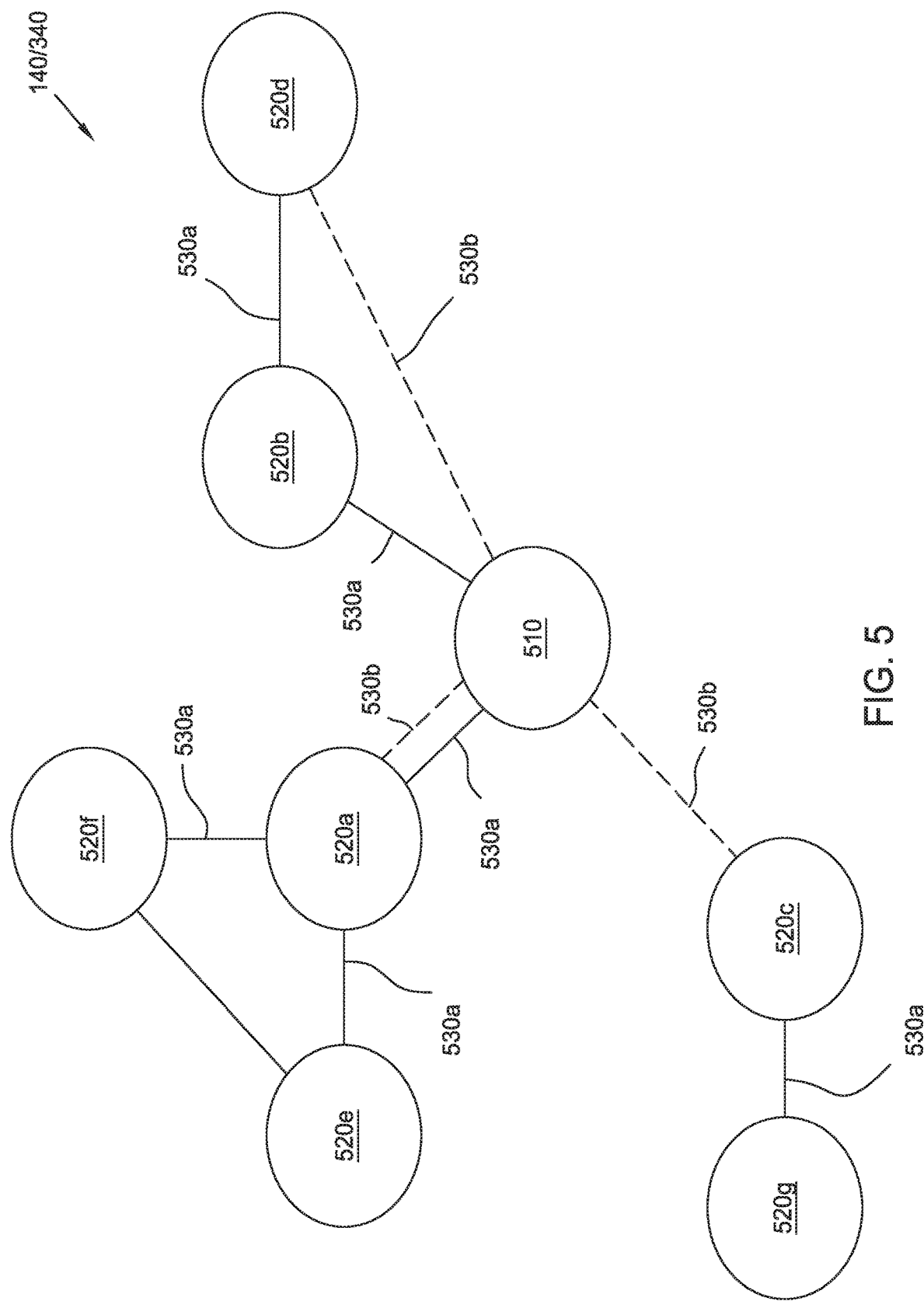
FIG. 5 illustrates an example social graph, according to aspects of the present disclosure.

FIG. 5 illustrates an example social graph 140 (or client social graph 340). In the social graph 140, a central node 510 represents the client or requesting user and is connected to various other nodes 520a-g (generally, nodes 520) that represent other entities by one or more edges 530a or 530b (generally, edges 530) according to connections indicated in a first social network 150a or a second social network 150b respectively.

The central node 510 may include data related to the client initiating a request, such as PII used to complete a service request, or may be a placeholder that includes no PII (for privacy reasons) and instead is used to link the various other nodes 520 for comparison against the organizational chart 330.

Each node 520 represents one entity and includes information mined from one or more social networks 150 specified by the requesting user. For example, a node 520 representing a person identified from a social network related to business connections may include the name and employment history of that person and the connections that person has to other persons. In another example, a node 520 representing a person identified from a social network 150 related to friendly or familial connections may include the name, age, preferences, domicile, and group memberships of that person. In a further example, if a person is identified from two or more social networks 150, data from all of those social networks 150 related to that person may be included in the node 520 representing that person. In cases where data fields from two or more social networks 150 overlap, but provide different information, the node 520 may include both values. For example, a person may have a name listed as "John Doe" in a friendly/familial social network 150 and as "Johnathan Doe" in a business social network 150, and both "John Doe" and "Johnathan Doe" may be included in the node 520 for that person in the social graph 140.

The edges 530 represent connections established between entities as indicated from the particular social networks 150. For example, edges 530a are associated with a first social network 150a, and edges 530b are associated with a second social network 150b. Each edge 530 may include information related to one or more of: an identity of the social network 150 from which the edge 530 was created, a time of creation, a frequency of contact, a type of connection to another node 520 or the central node 510 (e.g., friend, family, colleague, email contact), and the like.

In the illustrated social graph 140, a first node 520a, a second node 520b, a third node 520c, and a fourth node 520d are first order contacts to the user represented by the central node 510 due to needing only one edge 530 to connect those nodes 520a-d to the central node 510. In the illustrated social graph 140, the fifth node 520e, the sixth node 520f, and the seventh node 520g are second order contacts to the user represented by the central node 510 due to needing (at minimum) two edges 530 to connect those nodes 520e-g to the central node 510.

A given node 520 may have several edges 530 connecting the given node 520 to different nodes 520, and the connections may be established via one or more social networks 150. For example, the first node 520a is connected to a different number of node 520 than the second node 520b is connected to, and is connected to the central node 510 via two edges 530a/530b whereas the second node 520b is connected by one edge 530a.

Consider now an example in which the second social network 150b (associated with the illustrated edges 530b) is mined to update a social graph 140 based initially on relationships identified only from a first social network 150a (associated with the illustrated edges 530a). The social graph 140 in this example initially lacks the third node 520c and the seventh node 520g due to the link between the third node 520c and the central node 510 being based on an edge 530b identified from the second social network 150b (which is not initially present in this example). The new nodes 520 (such as third node 520c and seventh node 520g) include data from the second social network 150b, and may optionally include data from the first social network 150a related to the represented entities, for example, if the entities are located in both social networks 150, but were not included in the initial social graph 140 due to a connection within the designated social range of the client not being found in the first social network 150a. The existing nodes 520a,b,d-f may be updated with data from the second social network 150b and new edges 530b are formed between the entities. For example, the fourth node 520d in this example would be considered to be a second order contact to the requesting user until the edge 530b is created based on a relationship identified in the second social network 150b due to requiring two edges 530a to connect to the central node 510.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., social privacy application 130) or related data available in the cloud. For example, the social privacy application 130 could execute on a computing system in the cloud and ensure privacy in sensitive or embarrassing actions or requests based on social connections. In such a case, the social privacy application 130 could determine a preferred social range at which to conduct the actions or requests and store user preferences for privacy or a social graph 140 by which a social range between a requestor to the employees/clients of a provider entity may be determined at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for improving data security and privacy, comprising:

receiving, by a social privacy application, a service request including a social range and a requestor identity from a client-side system;

mining a first social network to create a social graph of entities within the social range of the requestor identity, wherein the entities are represented by nodes in the social graph linked to a requestor via one or more edges, wherein a number of edges used to link a given entity of the entities to the requestor does not exceed the social range;

accessing, by the social privacy application, an organizational chart hosted by a provider-side system;

determining, by the social privacy application, that the social graph includes at least one person matching personnel included in the organizational chart;

determining, by the social privacy application, that alternate personnel are available to handle the service request; and in response to determining that the alternative personnel are available to handle the service request:

routing the service request in the provider-side system to the alternative personnel to avoid the at least one person within the social range handling the service request; and transmitting an acceptance response to the client-side system that indicates that the provider-side system is capable of handing the service request within a privacy range specified by the client-side system.

2. The method of claim 1, wherein determining whether alternative personnel are available to handle the service request includes determining whether the service request allows alternative personnel to be made available.

3. The method of claim 1, further comprising:

in response to determining that the alternative personnel are not available to handle the service request, determining whether personally identifiable information (PII) in the service request is obfuscatable within the provider-side system;

in response to determining that the PII in the service request is obfuscatable to the at least one person:

replacing the PII with placeholder data for display to the at least one person linked to the PII for display to other personnel; and transmitting the acceptance response to the client-side system; and in response to determining that the PII in the service request is non-obfuscatable to the at least one person, transmitting a rejection response to the client-side system.

4. The method of claim 1, further comprising:

mining a second social network to update the social graph, wherein updating the social graph includes:

generating second edges that link the requestor to existing nodes in the social graph that represent entities found in the first social network and the second social network, wherein a number of second edges used to link a particular entity to the requestor does not exceed the social range; and generating new nodes representing new entities from the second social network that are not included in the social graph, wherein the new entities are linked to the requestor via one or more new edges, wherein a number of new edges used to link a given new entity of the new entities to the requestor does not exceed the social range.

5. The method of claim 1, wherein determining whether the social graph includes at least one person within the social range matching personnel included in the organizational chart within the social range further comprises:
performing a fuzzy match on names of persons in the social graph to names of persons in the organizational chart based at least in part on:
known spelling variations for names;
known nicknames; and
known aliases.

6. The method of claim 5, wherein the fuzzy match further comprises:
determining a geographic work range for a given person included in the organizational chart matching the at least one person within the social range based on a work location for each person;
determining a geographic social interaction range for the requestor; and
in response to determining that the geographic work range does not intersect the geographic social interaction range, determining that the given person is not included in the social graph.

7. A system, comprising:
a processor; and
a memory storage device including instructions that when executed by the processor enable the system to:
receive, via a social privacy application from a client-side system, a service request that specifies a privacy range including a social range and a requestor identity;
mine a first social network to create a social graph of entities within the social range of the requestor identity, wherein the entities are represented by nodes in the social graph linked to a requestor via one or more edges, wherein a number of edges used to link a given entity to the requestor does not exceed the social range;
accessing, by the social privacy application, an organizational chart hosted by a provider-side system;
determine whether the social graph includes at least one person matching personnel included in an organizational chart by performing, by the social privacy application, a fuzzy match on names of persons in the social graph to names of persons in the organizational chart, wherein performing the fuzzy match includes:
determining a geographic work range for a given person included in the organizational chart matching the at least one person within the social range based on a work location for each person;
determining a geographic social interaction range for the requestor; and
in response to determining that the geographic work range does not intersect the geographic social interaction range, determine that the given person is not included in the social graph; and
in response to determining that the social graph includes no persons matching the personnel included in the organizational chart, transmit an acceptance response from a provider-side system to the client-side system that indicates that the provider-side system is capable of performing the service request within the privacy range.

8. The system of claim 7, wherein the instructions, when executed by the processor, further enable the system to:
in response to determining that the social graph includes at least one person matching the personnel included in the organizational chart, determine whether alternative personnel are available to handle the service request;
in response to determining that the alternative personnel are available to handle the service request:
route the service request in the provider-side system to the alternative personnel to avoid the at least one person within the social range handling the service request; and
transmit the acceptance response to the client-side system.

9. The system of claim 8, wherein determining whether alternative personnel are available to handle the service request includes determining whether the service request allows alternative personnel to be made available.

10. The system of claim 8, wherein the instructions, when executed by the processor, further enable the system to:
in response to determining that the alternative personnel are not available to handle the service request, determine whether personally identifiable information (PII) in the service request is obfuscatable within the provider-side system;
in response to determining that the PII in the service request is obfuscatable to the at least one person:
replace the PII with placeholder data for display to the at least one person linked to the PII for display to other personnel; and
transmit the acceptance response to the client-side system; and
in response to determining that the PII in the service request is non-obfuscatable to the at least one person, transmit a rejection response to the client-side system.

11. The system of claim 7, wherein the instructions, when executed by the processor, further enable the system to:
mine a second social network to update the social graph, wherein updating the social graph includes:
generating second edges that link the requestor to existing nodes in the social graph that represent entities found in the first social network and the second social network, wherein a number of second edges used to link a particular entity to the requestor does not exceed the social range; and
generating new nodes representing new entities from the second social network that are not included in the social graph, wherein the new entities are linked to the requestor via one or more new edges, wherein a number of new edges used to link a given new entity of the new entities to the requestor does not exceed the social range.

12. The system of claim 7, wherein
the fuzzy match is performed on names of persons in the social graph to names of persons in the organizational chart based at least in part on:
known spelling variations for names;
known nicknames; and
known aliases.

13. A computer program product, comprising:
a computer-readable storage medium having computer-readable program code embodied therewith, the computer-readable program code executable by one or more computer processors to:
receive, by a social privacy application from a client-side system, a service request including a privacy range specifying a social range and a requestor identity;
mine a first social network to create a social graph of entities within the social range of the requestor identity, wherein the entities are represented by nodes in the social graph linked to a requestor via one or more edges, wherein a number of edges used to link a given entity to the requestor does not exceed the social range;

accessing, by the social privacy application, an organizational chart hosted by a provider-side system;

determine, by the social privacy application, whether the social graph includes at least one person matching personnel included in an organizational chart;

in response to determining that the social graph includes no persons matching the personnel included in the organizational chart, transmit an acceptance response from the provider-side system to the client-side system;

in response to determining that the social graph includes at least one person matching the personnel included in the organizational chart, determine whether alternate personnel are available to handle the service request; and in response to determining that the alternative personnel are available to handle the service request:

route the service request within the provider-side system to the alternative personnel to avoid the at least one person within the social range handling the service request; and transmit the acceptance response to the client-side system.

14. The computer program product of claim 13, wherein determining whether alternative personnel are available to handle the service request includes determining whether the service request allows alternative personnel to be made available.

15. The computer program product of claim 13, wherein the computer-readable program code is further executable by the one or more computer processors to:

in response to determining that the alternative personnel are not available to handle the service request, determine whether personally identifiable information (PII) in the service request is obfuscatable within the provider-side system;

in response to determining that the PII in the service request is obfuscatable to the at least one person:

replace the PII with placeholder data for display to the at least one person linked to the PII for display to other personnel; and transmit the acceptance response to the client-side system; and in response to determining that the PII in the service request is non-obfuscatable to the at least one person, transmit a rejection response to the client-side system.

16. The computer program product of claim 13, wherein to determine whether the social graph includes at least one person within the social range matching personnel included in the organizational chart within the social range the computer-readable program code is further executable by the one or more computer processors to:

perform a fuzzy match on names of persons in the social graph to names of persons in the organizational chart based at least in part on:

known spelling variations for names;

known nicknames; and known aliases.

17. The computer program product of claim 16, wherein to perform the fuzzy match the computer-readable program code is further executable by the one or more computer processors to:

determine a geographic work range for a given person included in the organizational chart matching the at least one person within the social range based on a work location for each person;

determine a geographic social interaction range for the requestor; and in response to determining that the geographic work range does not intersect the geographic social interaction range, determining that the given person is not included in the social graph.

* * * * *